No. 770,666. Patented September 20, 1904.

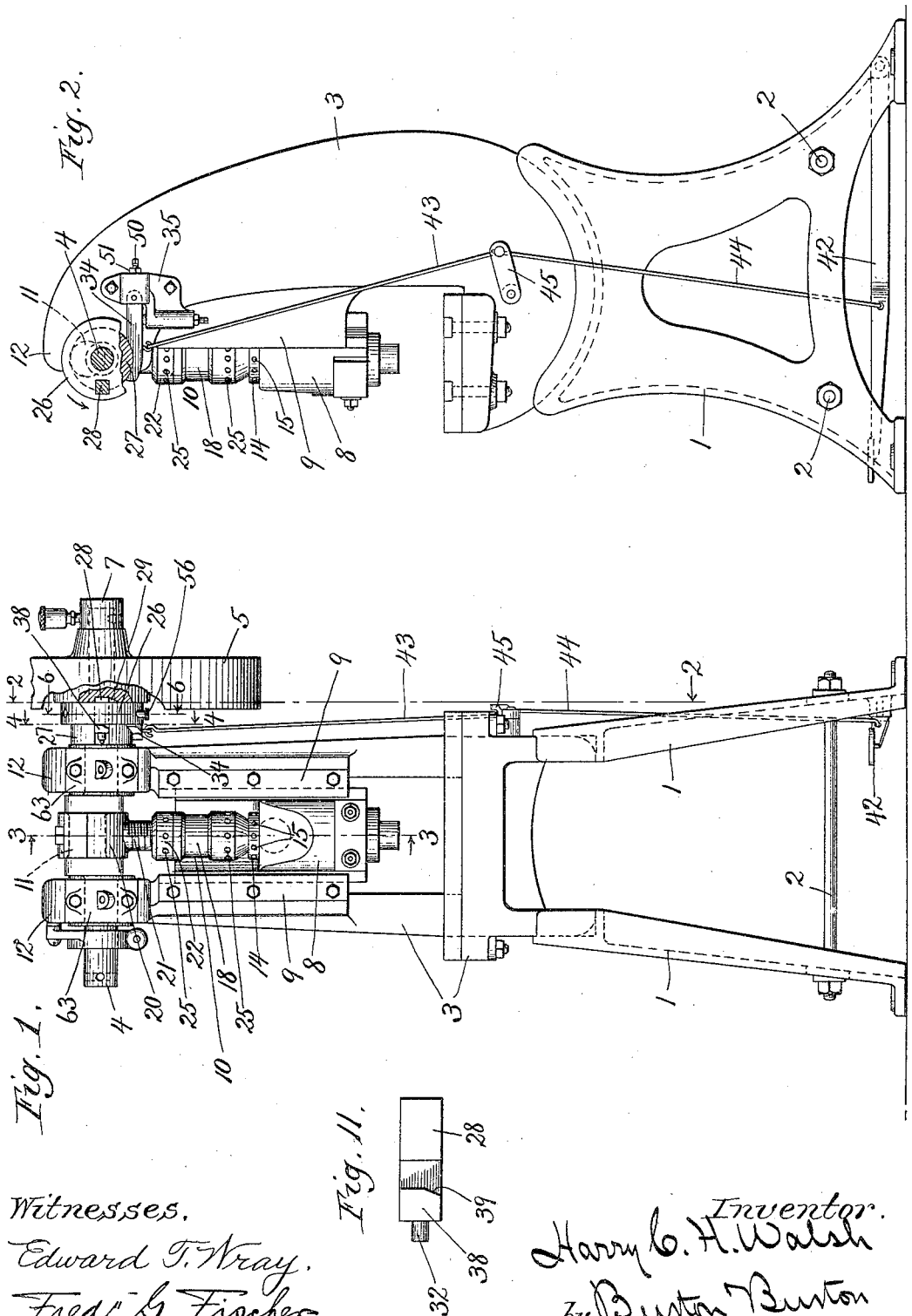
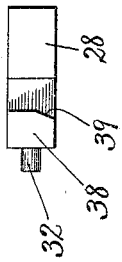

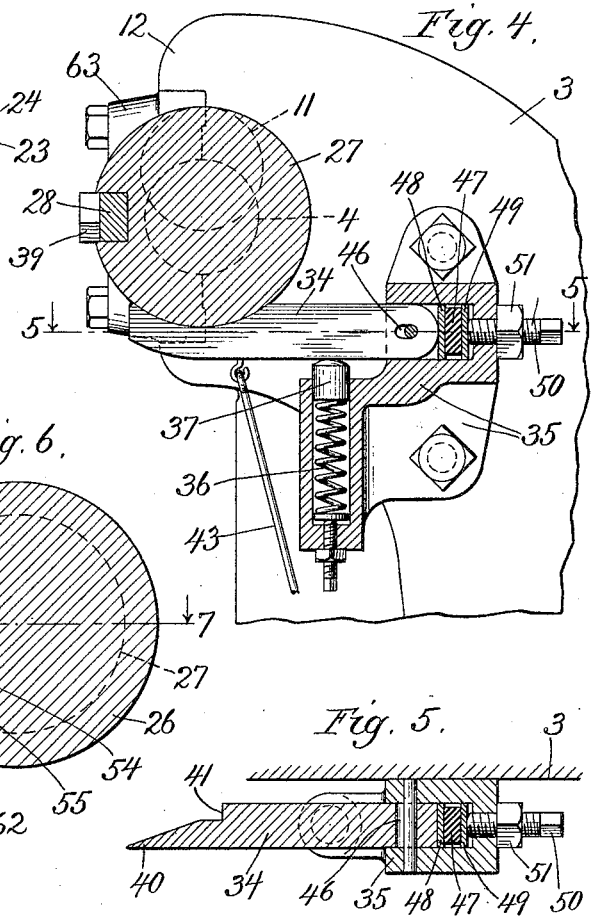

UNITED STATES PATENT OFFICE.

HARRY C. H. WALSH, OF CHICAGO, ILLINOIS, ASSIGNOR TO CONSOLIDATED PRESS AND TOOL COMPANY, OF CHICAGO, ILLINOIS, A CORPORATION OF ILLINOIS.

DIE-PRESS.

SPECIFICATION forming part of Letters Patent No. 770,666, dated September 20, 1904.

Application filed August 20, 1903. Serial No. 170,107. (No model.)

*To all whom it may concern:*

Be it known that I, HARRY C. H. WALSH, a citizen of the United States, residing at Chicago, in the county of Cook and State of Illinois, have invented new and useful Improvements in Die-Presses, of which the following is a specification, reference being had to the accompanying drawings, forming a part thereof.

The purpose of this invention is to effect certain improvements in the construction and operation of die-presses to diminish the danger of accident in their use by reason of breakage or failure to act of the tripping device, to facilitate the vertical adjustment of the upper or reciprocating die-holder, and to improve the efficiency in other details.

It consists in the features of construction which are set out in the claims.

In the drawings, Figure 1 is a front elevation of my improved machine with a portion of the fly-wheel broken away to disclose certain details. Fig. 2 is a sectional side elevation of the same with the fly-wheel removed, section being made through the shaft at the plane 2 2 on Fig. 1 and a portion of the latter being broken away to show a detail of the clutch-tripping device. Fig. 3 is a detail section at the line 3 3 on Fig. 1 on a larger scale. Fig. 4 is a detail section at the line 4 4 on Fig. 1 on a still more enlarged scale. Fig. 5 is a detail section at the line 5 5 on Fig. 4. Fig. 6 is a detail section at the line 6 6 on Fig. 1 on a larger scale. Fig. 7 is a detail section at the line 7 7 on Fig. 6. Fig. 8 is an elevation of the inner side of the cap on one of the journal-boxes of the main shaft. Fig. 9 is a section at the line 9 9 on Fig. 8. Fig. 10 is a detail section at the line 10 10 on Fig. 3. Fig. 11 is a detail view of the clutch-slide.

The frame of this improved press comprises standards or supports 1 1, suitably tied together by the cross-rods 2 2 and the integral jaw-frame 3—that is, the frame in which are mounted the fixed die-bed and reciprocating head for the operating die or punch, and which is exposed to the stress of the action of the coöperating dies in doing their work.

4 is the main shaft on which the power-communicating and fly wheel 5 is mounted and to which said wheel is locked for rotating the shaft by the customary clutch-slide 28, the action of which is hereinafter more particularly explained.

7 is a stop-collar on the end of the shaft by which the fly-wheel is retained on the latter.

The reciprocating head 8 is operated in the vertical guideways 9 9 by a pitman 10, connected to the eccentric wrist 11 of the main shaft 4 between the two bearings 12 12, which said shaft obtains in the upper end of the jaw-frame 3.

One feature of the improvements which constitute this invention relates to the structure of the pitman 10 and its connection with the reciprocating head. The lower end of this pitman is connected with the head by a ball-and-socket joint, the ball 13, which terminates the pitman, being retained in a two-part socket in the upper end of the head, of which the upper part is the annular element 14, which is screwed into the upper end of the head to afford the upper half of the socket for retaining the ball. This annular element has a flange provided with apertures 15 for a spanner-wrench, with which it may be adjusted to compensate for any work or to take up any looseness which may arise in the joint, a clamp-screw 16 being provided, as seen in Fig. 3, to clamp the thread and secure it against accidental slacking. This terminal ball is most conveniently made in a separate piece from the remainder of the pitman and secured thereto by having its stem 17 screwed into the lower end of the intermediate element or coupling 18 and made as secure as if it were integral therewith by being screwed up tight to the shoulder 19. The upper element 20 of the pitman is pivoted by means of a suitable journal-box on the eccentric wrist 11, as stated, and has a threaded stem 21, which screws into the upper end of the coupling 18, and a jam-nut 22 is provided on said stem at the upper end of the coupling. Projecting from the upper end of the coupling there is a pin 23, which takes into a slot 24 in the lower face of the jam-nut 22, said slot extending through an arc sufficient for the release of the nut from its jamming action on the end of the coupling. Both the jam-nut and the coupling are provided with suitable apertures 25 for a spanner-wrench or equivalent tool, so that the jam-nut may be slackened by rotation to the extent of the slot 24, and the further rotation in the direction for slackening will carry the coupling and cause it to be screwed upon the stem 21 to lift the reciprocating head, and the rotation of the coupling in the opposite direction, which may be done by the spanner engaging the coupling itself in the lower series of apertures 25, will screw the coupling down on the stem and lower the reciprocating head. The accurate adjustment of the reciprocating head for adjusting the punch or die carried thereby with respect to a die in the fixed bed can thus be made quickly and readily at any time when the fly-wheel is not rotating the shaft.

The main shaft 4 is formed with the flange or enlargement 26 27 intermediate the end portion on which the fly-wheel is journaled and the journal of the shaft in its bearing 12 at the right-hand side. In this flange the clutch-slide 28 is mounted and adapted to be thrust into the hub of the fly-wheel, which has the socket 29 to receive it, so that the fly-wheel drives the shaft by means of said clutch-slide. The slide is thrust into such engagement and held normally engaged by the spring 30, lodged in the socket 31 in the slide and reacting by means of the telescoping cap 32 against the stud 33, set into the flange at the portion 27 thereof next to the bearing 12. For tripping the clutch-slide out of engagement with the fly-wheel and bringing the shaft to rest there is provided a shoe or shipping-cam 34, which is pivoted in a bracket 35, mounted rigidly on the side of the jaw-frame 3 and extending thence forwardly under the portion 27 of the flange or enlargement of the shaft, as seen most clearly in Figs. 1, 2, and 4. A spring 36, lodged in a socket in the bracket 35, operates, by means of a thrust-bolt 37, telescoped in the socket, against the lower side of the shoe 34 to uphold it against the under side of the portion 27 of the flange or shaft enlargement. The clutch-slide extending entirely through the portion 26 of the flange enlargement of the shaft is exposed when it protrudes therefrom at the left-hand side and radially from the smaller portion 27 of said flange, and said slide has at its said protruding and exposed end the tooth or projection 38, cut away or beveled at 39 on the side toward the flange 26, and the forward end of the shoe 34 is tapered to form a wedge-terminal at 40, adapted to enter between the left-hand face of the flange 26 and the beveled corner of the projection 38 as the shaft rotates, carried by the clutch-slide, when the latter is engaged with the fly-wheel. When thus entered, the rotation for the distance of the length of the wedge-terminal 40 causes the latter to withdraw the slide from engagement with the fly-wheel, and at the limit of such withdrawing action the slide-tooth collides with the abrupt shoulder 41 on the shoe, which is at the position at which the shaft should come to rest with the eccentric and reciprocating heads at their highest position. A pedal-lever 42, connected with the tripping-shoe by suitable links 43 and 44, with the intermediate deflecting lever 45, enable the operator to pull down the shipping-lever, so that it will be out of the path of the clutch-slide and hold it down so long as the action of the press is to continue without interruption. The release of the pedal-lever permits the shoe to be immediately thrown up by the spring 36 into position for tripping the clutch-slide, as described.

In general, the action of the clutch-slide and tripping-shoe above described is similar to that which has heretofore been employed; but the difficulty encountered in the use of such construction hitherto consists in the liability of the tripping-shoe or the pivot by which it is connected to the fixed parts of the machine to become crystallized by the repeated shock caused by the blow of the clutch-slide against it with the momentum of the shaft and parts thereon whose motion is arrested by such collision. Such crystallization having occurred, the breakage of either the pivot or the shoe is liable to occur unexpectedly and when it occurs is liable to result in a serious accident, because the press does not stop, but the shaft becomes reëngaged by the clutch with the fly-wheel and renews or continues its rotation. To overcome this difficulty, the shoe 34 is slotted, as seen at 46, for engagement with its pivot and is held at the forward limit of its range of accommodation on the pivot which said slot affords by a spring lodged in the bracket 35 and acting upon the rear end of the shoe to hold it forward. This spring is desirably so heavy and adapted to permit so slight movement that it will simply absorb the shock caused by the encounter of the clutch-slide with the shoulder 41 of the shoe without permitting sufficient movement of the slide to materially affect the position at which the shaft comes to rest as the result of such encounter. To meet these conditions, a heavy rubber spring 47 is preferably employed, the same being lodged between metal plates 48 and 49, the former furnishing the bearing-surface against the rear end of the slide, while the latter receives the thrust of a tension-adjusting screw 50, set through the rear end of the bracket and impinging on said rear plate 49, said screw being provided with a jam-nut 51 to hold it as adjusted.

In order to guard against the accidental tripping of the clutch-slide to throw the press into action at a time when the operator may be adjusting dies and when such action would cause serious accident, there is provided a locking-bolt 52, which is set through the larger portion 26 of the flange 26 27 of the shaft at a position crossing the inner edge of the slide bearing or seat of the clutch-slide 28, as seen in Figs. 6 and 7. This bolt is reduced to form a comparatively slender stem 53, about which there is coiled a spring 54, which is accommodated in the chamber bored out for the bolt in the flange, as stated and as clearly seen in Fig. 6, said chamber being formed with a diaphragm at 55, apertured to accommodate the stem only, and an operating-handle 56 being provided for the bolt, which is made fast on the handle, being inserted into the chamber at the lower end up to the diaphragm 55, which stops the spring at one end, while the other end is stopped against the full-sized head of the bolt 52. The spring tends to hold the bolt in the position shown in Fig. 6, with its full-sized head out of the path or seat of the clutch-slide; but said slide has a notch 57, adapted to accommodate the full-sized head 52 of the bolt, said notch being in position to be in the path of said bolt when the clutch is out of engagement with the fly-wheel. The handle 56 of the bolt where it protrudes from the flange 26 has a pin 60, and the flange has two shoulders 61 and 62 at opposite sides of the bolt-handle, the shoulder 61 being at a position to permit the bolt to be thrust in by its spring, so as to carry its operating-head out of the path of the clutch-slide, the other shoulder 62 being at a position to afford lodgment for the pin by rotating the bolt one hundred and eighty degrees, when it is pulled out to a position to cause the enlarged head to engage the notch 57, which, it will be understood, can be done only when the clutch is disengaged, and when this bolt is thus pulled out and turned so as to engage its pin 60 with the shoulder 62 it locks the clutch-slide at said disengaged position, and any accidental pressure upon the pedal-lever 42 withdrawing the shoe will be without effect upon the action of the press, because the slide is restrained by the bolt even when relieved from the restraint of the shoe.

In presses of this type in which the journal-bearings on the shaft are desirably divided vertically, the cap being applied at the forward side instead of at the top, difficulty has been experienced in providing suitable oil-reservoirs from which the bearings of the shaft might be automatically lubricated without gravity flow of the oil, which is liable to cause excessive supply. This difficulty is overcome in the structure shown, in which in the cap 63 of each of the journal-bearings of the shaft 4 there is formed an oil-reservoir 64 below the horizontal plane of the shaft-axis and having an opening for filling at the forward side of the cap, the latter having a boss 65, through which a filling-passage is formed leading to the reservoir, adapted to receive a screw-plug or an oil-cup, either of which may be understood to be represented at 66 in Fig. 9. A capillary feed-wick 67 conducts the oil up and over to the upper side of the bearing, being lodged for that purpose in the duct 68.

I claim—

1. In a die-press, in combination with the operating-shaft and the power-wheel loose thereon, a clutch-slide for locking the power-wheel to the shaft; means for disengaging the slide and for arresting the rotation of the shaft, the arresting device being mounted in the frame with slight range of movement in the direction in which the encounter of the shaft therewith in the arresting action of said device tends to drive the latter, and a spring which resists such movement.

2. In a die-press, the combination with the operating-shaft and the power-wheel clutched thereto, means for disengaging the clutch and for arresting the rotation of the shaft, the shaft-arresting device being mounted in the frame with range of movement in the direction in which the encounter of the shaft therewith in the arresting action of said device tends to move the latter, and a cushion which yieldingly resists such movement.

3. In a die-press, in combination with the operating-shaft and the power-wheel clutched thereto, a shoe pivoted to the frame and means for holding it normally in position to disengage the clutch; said shoe being adapted, when in such position, and after having disengaged the clutch, to arrest and lock the shaft against rotation, and means for withdrawing said shoe from said position by movement about its pivot, the pivot-bearing being elongated or slotted to allow limited movement of the shoe longitudinally in addition to its pivotal movement, and a cushion for the shoe back of the pivot yieldingly resisting such longitudinal movement of the shoe.

4. In a die-press, in combination with the operating-shaft and the power-wheel loose thereon, said shaft having a flange against which the power-wheel abuts, a clutch-slide mounted in such flange, the power-wheel having a recess for engagement of the slide; a spring, which tends to thrust the slide into engagement therewith; a shoe mounted on the frame at the opposite side of the flange from the power-wheel, adapted to engage the clutch-slide as the shaft rotates to disengage it from the wheel, said shoe having a shoulder which receives the encounter of the slide to arrest the shaft after the slide is disengaged from the wheel, and a cushion mounted in the frame back of the shoe adapted to yield to permit movement of the shoe when such encounter occurs.

5. In a die-press, in combination with the operating-shaft and the power-wheel loose thereon, a clutch-slide mounted on the shaft adapted to engage the power-wheel to transmit movement from the latter to the shaft; a spring tending to hold the clutch-slide in such engagement; means for disengaging the slide and for arresting the shaft, and a bolt adapted to be operated at will to lock the slide on the shaft at such disengaged position.

6. In a die-press, in combination with the operating-shaft and the power-wheel loose thereon, a clutch-slide mounted on the shaft for engaging the same with the power-wheel, and a bolt extending transversely with respect to such slide, the latter having a notch for engagement with the bolt at the position of the slide at which it is disengaged from the wheel, said bolt being exteriorly accessible for engaging it with and disengaging it from the slide.

7. In a die-press, in combination with the operating-shaft and the power-wheel loose thereon, a clutch-slide mounted on the shaft for engaging the same with the power-wheel; a bolt also mounted on the shaft extending transversely with respect to the slide, the latter having a notch for engagement with the bolt at the position of the slide at which the latter is disengaged from the wheel; a spring tending to thrust the bolt in direction to effect engagement with the slide, the bolt being also adapted to rock in its seat, and being exteriorly accessible, and having a projection, the shaft having a shoulder adjacent to the seat of the bolt therein for engaging said projection when the bolt is longitudinally moved for engagement with the slide and rocked in its seat.

In testimony whereof I have hereunto set my hand, in the presence of two witnesses, at Chicago, Illinois, this 4th day of August, A. D. 1903.

HARRY C. H. WALSH.

In presence of—
T. J. COTTER,
CHAS. S. BURTON.